United States Patent
Garlapati et al.

(10) Patent No.: US 11,210,691 B2
(45) Date of Patent: Dec. 28, 2021

(54) SYSTEMS AND METHODS FOR IDENTIFYING NEGOTIABLE ITEMS

(71) Applicant: Walmart Apollo, LLC, Bentonville, AR (US)

(72) Inventors: Mani Kanteswara R. Garlapati, Bangalore (IN); Souradip Chakraborty, Bangalore (IN); Todd D. Mattingly, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 3 days.

(21) Appl. No.: 16/773,576

(22) Filed: Jan. 27, 2020

(65) Prior Publication Data
US 2020/0242651 A1    Jul. 30, 2020

Related U.S. Application Data

(60) Provisional application No. 62/823,947, filed on Mar. 26, 2019.

(30) Foreign Application Priority Data

Jan. 29, 2019   (IN) .............................. 201941003505

(51) Int. Cl.
*G06Q 30/02* (2012.01)
*G06F 3/0482* (2013.01)
*G06Q 30/06* (2012.01)

(52) U.S. Cl.
CPC ....... *G06Q 30/0223* (2013.01); *G06F 3/0482* (2013.01); *G06Q 30/0239* (2013.01); *G06Q 30/0611* (2013.01); *G06Q 30/0633* (2013.01); *G06Q 30/0641* (2013.01)

(58) Field of Classification Search
CPC .......... G06Q 30/0223; G06Q 30/0611; G06Q 30/0633; G06Q 30/0641; G06F 3/0482
See application file for complete search history.

(56) References Cited

U.S. PATENT DOCUMENTS

| 8,234,225 | B2 | 7/2012 | Davis |
| 8,374,906 | B1 | 2/2013 | Williams |
| 10,332,181 | B1 * | 6/2019 | McAllister ......... G06Q 30/0629 |
| 10,936,599 | B2 * | 3/2021 | Murray ................. G06F 40/109 |

(Continued)

*Primary Examiner* — David J Stoltenberg
*Assistant Examiner* — Michael J Cross
(74) *Attorney, Agent, or Firm* — Fitch, Even, Tabin & Flannery, LLP

(57) ABSTRACT

In some embodiments, apparatuses and methods are provided herein useful to automatically determining a discount for an item. In some embodiments, a system comprises an item database including information about a plurality of items, a control circuit configured to determine substitute items, calculate a score indicative of how similar a substitute item is to an item, determine a group of substitute items including items for which the score is above a threshold, determine a list of negotiable items, generate a user interface including the list of negotiable items, receive selection of one of the items from the list of negotiable items, determine the discount for the one of the items, and update the user interface to present the discount for the one of the items, a display device configured to present the user interface, and the user input device configured to receive the selection of the one of the items.

18 Claims, 5 Drawing Sheets

(56) References Cited

U.S. PATENT DOCUMENTS

| | | | |
|---|---|---|---|
| 2002/0046157 A1* | 4/2002 | Solomon | G06Q 30/0601 |
| | | | 705/37 |
| 2002/0178109 A1 | 11/2002 | Bye | |
| 2003/0004821 A1 | 1/2003 | Dutta | |
| 2003/0023499 A1* | 1/2003 | Das | G06Q 30/0613 |
| | | | 705/26.3 |
| 2005/0289041 A1 | 12/2005 | Chowdary | |
| 2008/0126196 A1 | 5/2008 | Perdomo | |
| 2010/0223103 A1* | 9/2010 | Patel | G06Q 30/0206 |
| | | | 705/7.35 |
| 2012/0265630 A1* | 10/2012 | McLaughlin | G06Q 30/06 |
| | | | 705/26.1 |
| 2013/0073342 A1 | 3/2013 | Crump | |
| 2014/0089129 A1* | 3/2014 | Argue | G06Q 30/0631 |
| | | | 705/26.7 |
| 2014/0108097 A1 | 4/2014 | Gange | |

\* cited by examiner

SYSTEMS AND METHODS FOR IDENTIFYING NEGOTIABLE ITEMS

CROSS-REFERENCE TO RELATED APPLICATION

This application claims the benefit of Indian Provisional Application No. 201941003505, filed Jan. 29, 2019, and U.S. Provisional Application No. 62/823,947, filed Mar. 26, 2019, which are incorporated by reference in their entirety herein.

TECHNICAL FIELD

This invention relates generally to retail purchased and, more particularly, negotiating the cost of retail purchases.

BACKGROUND

Retailers regularly engage in negotiations with suppliers regarding the costs of items provided by the supplier that the retailers sell. Understandably, the retailers and suppliers wish to come to mutually agreeable terms. That is, retailers do not want to overpay for items and suppliers have an interest in making money selling items to retailers. These negotiations are handled by representatives of the retailers and suppliers. Often, retailers will attempt to negotiate better prices on items that aren't performing as well as they'd like. Part of this negotiation process is for the retailer, and possibly the supplier, to compile data for the item as well as similar items. The compilation of data is time consuming and ultimately retailers, as well as suppliers, incur costs in doing so. Additionally, before a negotiation can occur, a retailer, or supplier, must identify an item for which they believe the price can be negotiated. Accordingly, a need exists for better systems and methods that can aid in automating at least portions of this process.

BRIEF DESCRIPTION OF THE DRAWINGS

Disclosed herein are embodiments of systems, apparatuses, and methods pertaining to automatically determining a discount for an item. This description includes drawings, wherein.

Figure 1:
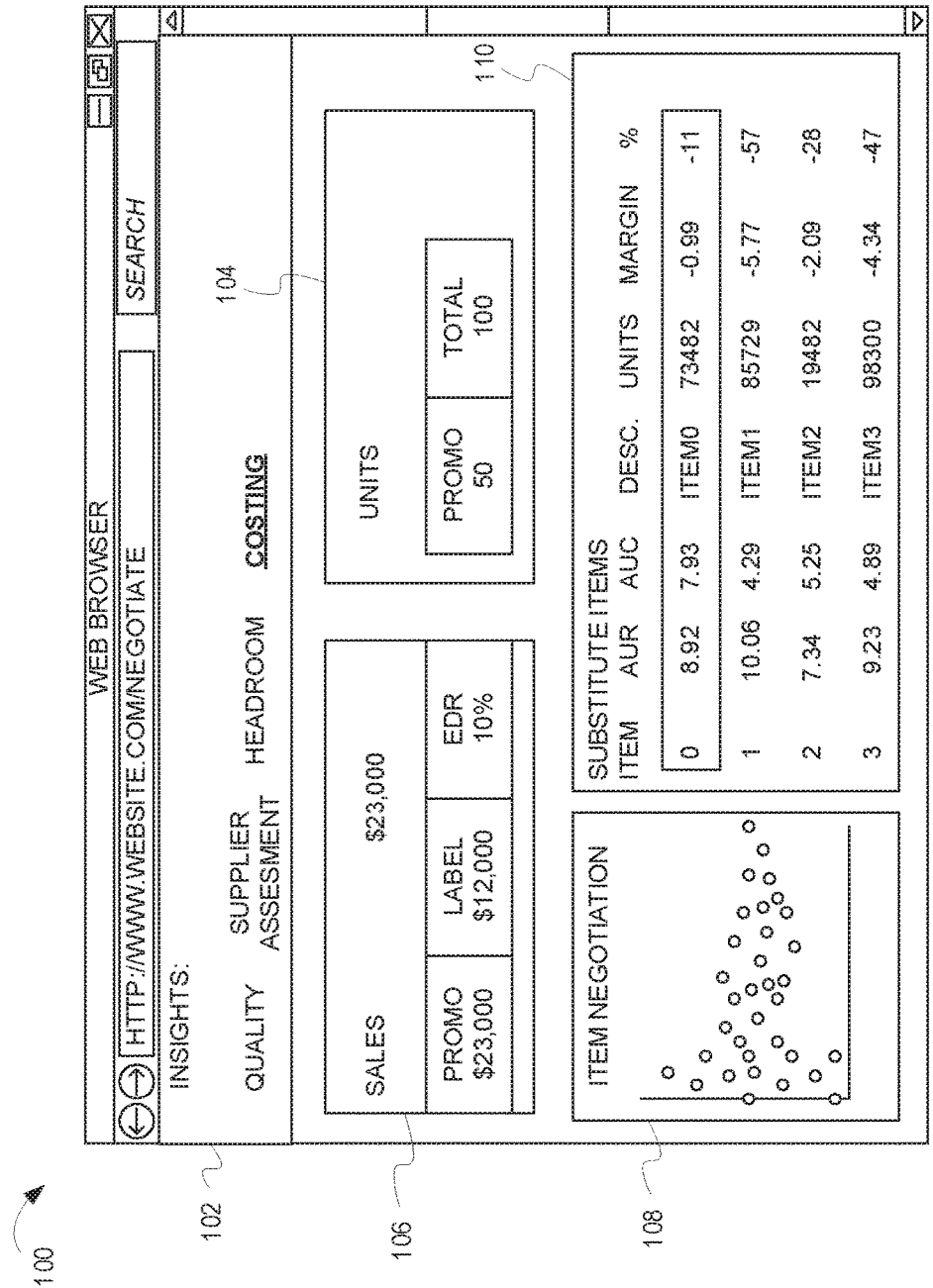
FIG. 1 depicts a browser 100 presenting a user interface, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, and methods are provided herein useful to automatically determining a discount for an item. In some embodiments, a system comprises an item database, wherein the item database includes information about a plurality of items, wherein the information about the plurality of items includes costs of the items, average retail prices for the items, and descriptions of the items, a control circuit, wherein the control circuit is communicatively coupled to the item database, wherein the control circuit is configured to determine, for each of the plurality of items in the database, substitute items, calculate, for each of the substitute items, a score, wherein the score is indicative of how similar a substitute item is to an item, determine, for each of the plurality of items, a group of substitute items, wherein the group of substitute items includes items for which the score is above a similarity threshold, determine, from amongst the plurality of items, based on margins for the substitute items and margins for the plurality of items, a list of negotiable items, generate a user interface, wherein the user interface includes the list of negotiable items, receive, from a user input device, selection of one of the items from the list of negotiable items, determine, for the one of the items based on the margins for a group of substitute items associated with the one of the items, the discount for the one of the items, and update the user interface to present information about the one of the items, the group of substitute items associated with the one of the items, and the discount for the one of the items, a display device, wherein the display device is communicatively coupled to the control circuit, wherein the display device is configured to present the user interface including the information about the one of the items, the group of substitute items associated with the one of the items, and the discount for the item, and the user input device, wherein the user input device is configured to receive, from a user, the selection of the one of the items from the list of negotiable items.

As previously discussed, retailers and suppliers regularly negotiate the cost of items sold by the retailers and purchased from the suppliers. From a simple economic perspective, the retailers want to pay as little as possible for the items and the retailers want to charge as much as possible for the items. Much like any negotiation, the retailers and suppliers attempt to achieve a mutually satisfactory price for the items. Coming to this mutually agreeable price requires significant work for both the retailers and suppliers. For example, a retailer must consider the price at which an item can be sold and data regarding similar items, and suppliers must consider the costs incurred to make, or buy, the items as well as cost data for similar items. Such preparation requires significant time expenditures for both retailers and suppliers. For example, a retailer or supplier may buy and sell thousands of different items. Compiling data not only for the thousands of items, but all comparable or substitute items, is a large task.

Embodiments of the systems, methods, and apparatuses described herein seek to minimize the time and cost requirements of negotiating prices for items. For example, in one embodiment, a system automatically compiles sales data and cost data for a number of items (e.g., all or most of the items that a retailer sells) as well as sales data and cost data for substitute items (i.e., comparable or similar items). Using this data, the system automatically generates a list of items that are believed to be negotiable and provides this list to a user. The user can then select any of the items to view the cost and sales data not only for the item, but also for substitute items. In this manner, a user can quickly review the relevant data and make an informed decision. Additionally, in some embodiments, the system can even determine a discount for an item.

In addition to providing retailers with negotiation information, in some embodiments, the system can be adapted to provide similar information to suppliers. As will be discussed in more detail with respect to FIGS. 4 and 5, in some embodiments, the negotiation process between a retailer and a supplier can be automated by way of buyer bots and seller bots.

The discussion of FIG. 1 provides an overview of automatically determining a discount for an item.

FIG. 1 depicts a browser 100 presenting a user interface, according to some embodiments. The user interface includes information about items sold by a retailer, substitute items (i.e., similar items) that are sold by the retailer and/or other retailers, and discounts for items. Specifically, the user interface depicted in FIG. 1 provides costing information for an item, including sales data 106 for the item, unit data 104 for the item, an item negotiation chart 108 for the item, and a list of substitute items 110 for the item. Additionally, the user interface includes selections 102 such as a quality section, a supplier assessment section, and a headroom section, in addition to the costing section selected in FIG. 1. The user interface depicted in FIG. 1 is what is presented after a user selects an item from a list of negotiable items (discussed in more detail with respect to FIGS. 2 and 3).

The user interface depicted in FIG. 1 aids a user in negotiating a price for an item. That is, if the user is a representative of, or otherwise responsible for pricing for, a retailer, the user can quickly view the data provided by the user interface. For example, the user can quickly and easily see that that the total sales for the item are $23,000 based on the sales data 106, that 100 units of the item have been sold based on the unit data 104, and the number of units sold and the margin based on the item negotiation chart 108. Additionally, the user can view item data for a number of substitute items in the list of substitute items 110. While the list of substitute items 110 depicted in FIG. 1 includes only three substitute items, embodiments are not so limited. That is, the list of substitute items 110 can include greater, or fewer, than three substitute items. The list of substitute items 110 includes the average unit cost ("AUC") for each of the items (i.e., the average cost for the retailer to purchase the item), the average unit retail ("AUR") for each of the items (i.e., the average selling price for the item for the retailer), a description of the items (e.g., a product identifier, a short textual description, etc.), a number of units sold of each of the items, a margin for each of the items (i.e., the difference between the AUR and the AUC), and the margin percent for each of the items (i.e., the margin for the item relative to the AUR). In some embodiments, the substitute item 110 list (or another portion of the user interface) can include similar information for the item in question. As depicted in FIG. 1, the item in question as listed as item number zero (i.e., "Item0").

Referring specifically to the example data depicted in FIG. 1, the AUR for the item (i.e., the item in consideration denotes as "Item0") is $8.92, the AUC is $7.93, the number of units sold is 73,482, the margin is $0.99, and the margin percentage is 11%. Comparing Item0 to the three substitute items (i.e., Item1, Item2, and Item3) reveals that the margin for Item0 is significantly lower than that of the substitute items. Specifically, the margins are $5.77, $2.09, and $4.34 for Item1, Item2, and Item3, respectively, as opposed to $0.99 for Item0. Additionally, the margin percentage is 57%, 28%, and 47% for Item1, Item2, and Item3, respectively, as opposed to 11% for Item0. Consequently, Item0 may be a good candidate for negotiation. That is, because the margins are higher for substitute items, a retailer may be in a good position to negotiate a lower cost for Item0 (i.e., a discount for Item0). In one embodiment, the system performs this analysis on a large number of items (e.g., all items a retailer sells, items in certain categories, items in certain price points, etc.). The system then, based on the margins, generates a list of negotiable items (i.e., items for which it is possible or likely that the retailer will be able to negotiate a lower cost). It is also worth noting that this system can be adapted for use by suppliers. That is, the system can be adapted to compile a list of negotiable items for a supplier (i.e., items for which it is possible or likely that the supplier will be able to negotiate a higher cost).

The system presents the list of negotiable items to the user. The user can select the items from the list to view additional information about the item. For example, the additional information for the item can include the information depicted in the user interface of FIG. 1. In some embodiments, the system calculates a discount for the item. The discount for the item is determined based on the margins for the group of substitute items. Returning to the example data depicted in FIG. 1, the average margin for the substitute items (i.e., Item1, Item2, and Item3) is 44%. In this example, the system may suggest a discount for the item (i.e., Item0) that places the margin for the item at or near the average margin for the substitute products. That is, if the AUC for Item0 is negotiated to $3.92 and the AUR for Item0 remains the same (i.e., $8.92), the margin for Item0 at the new price will be approximately 44%. The system can present this discount as a price goal for the item (i.e., $3.92 for Item) or as a discount goal for the item (i.e., the difference between the current AUC and the desired AUC, which is $4.01). In addition to the discount, the system can provide a negotiation recommendation. The negotiation recommendation can be based on any suitable factors, such as supplier volume, supplier capacity, supplier lead time, number of items a supplier provides to a retailer, etc.

Figure 2:
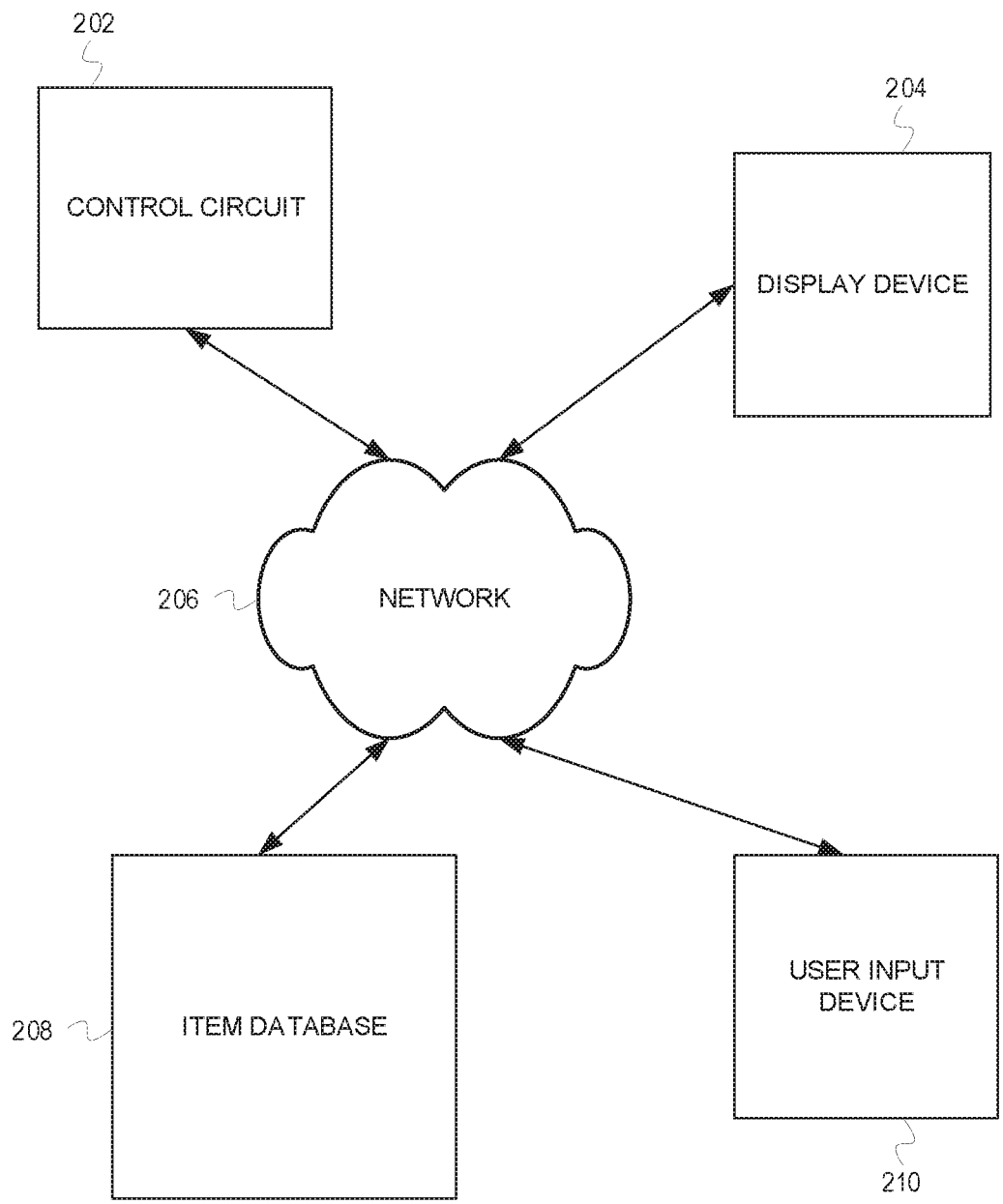
FIG. 2 is a block diagram of a system 200 for automatically determining a discount for an item, according to some embodiments.

While the discussion of FIG. 1 provides an overview of automatically determining a discount for an item, the discussion of FIG. 2 provides additional detail regarding a system for automatically determining a discount for an item.

FIG. 2 is a block diagram of a system 200 for automatically determining a discount for an item, according to some embodiments. The system 200 includes a control circuit 202, a display device 204, an item database 208, and a user input device 210. The control circuit 202, display device 204, item database 208, and user input device 210 are communicatively coupled via network 206 (e.g., a local area network (LAN) and/or wide area network (WAN), such as the Internet). Although FIG. 2 depicts each of these components being coupled via the network 206, such is not required. For example, one or more of the components may be directly connected to others of the components or incorporated in a single device. As one example, the user input device 210 and the display device 204 may be incorporated in a single device, such as a laptop computer, or directly coupled in the case of a desktop computer.

The item database 208 includes information about a plurality of items. For example, the item database 208 can include information for items that the retailer sells, items that other retailers sell, and/or items that a supplier provides. The information about the plurality of items can include any suitable data. For example, the information about the plurality of items can include costs of the items (e.g., AUCs for each of the items), average retail prices for the items (e.g., AURs for the items), and descriptions of the items. The descriptions of the items can be used to calculate scores for the items. The scores for the items are indicative of how similar an item is to a substitute item. For example, the scores can range from 0-1, 1-10, etc. and represent how similar a substitute item is to the item. In some embodiments, the item database 208 includes indications of substitute items and scores for the substitute items.

The control circuit 202 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 202 is configured (for example, by using corresponding programming as will be well understood by those skilled in the art) to carry out one or more of the steps, actions, and/or functions described herein.

By one optional approach the control circuit 202 operably couples to a memory. The memory may be integral to the control circuit 202 or can be physically discrete (in whole or in part) from the control circuit 202 as desired. This memory can also be local with respect to the control circuit 202 (where, for example, both share a common circuit board, chassis, power supply, and/or housing) or can be partially or wholly remote with respect to the control circuit 202 (where, for example, the memory is physically located in another facility, metropolitan area, or even country as compared to the control circuit 202).

This memory can serve, for example, to non-transitorily store the computer instructions that, when executed by the control circuit 202, cause the control circuit 202 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

The control circuit 202 performs the operations necessary to determine which items are negotiable and discounts for items. The control circuit 202 compiles a group of substitute items based on the scores for the items. In one embodiment, the control circuit 202 calculates scores for the items. For example, if the item in question is a bottle of shampoo, the control circuit 202 may calculate scores for all other bottles of shampoo sold by the retailer and/or bottles of shampoo sold by other retailers. The control circuit can then generate the group of substitute items based on the scores of the item being, for example, above a similarity threshold.

The control circuit 202 determines a list of negotiable items based on the item and the substitute items. For example, the control circuit 202 can consider the margins for the substitute items relative to the margin for the item. The list of negotiable items includes those items for which it is possible and/or likely that a discount can be negotiated. The control circuit 202 generates a user interface including the list of negotiable items. The display device 204 presents the user interface. The items in the list of negotiable items are selectable by the user via the user input device 210. For example, a user can select one of the items from the list of negotiable items to view details about that item (e.g., as depicted in FIG. 1). Upon selection of one of the items, the control circuit 202 updates the user interface to include the details about the selected item.

In addition to determining the list of negotiable items, the control circuit 202 can determine discounts for items. For example, returning to the example provided in FIG. 1, the control circuit 202 can calculate a discount for the item based on the margins of the substitute items. In such embodiments, the user interface can include the discount for the item.

Figure 3:
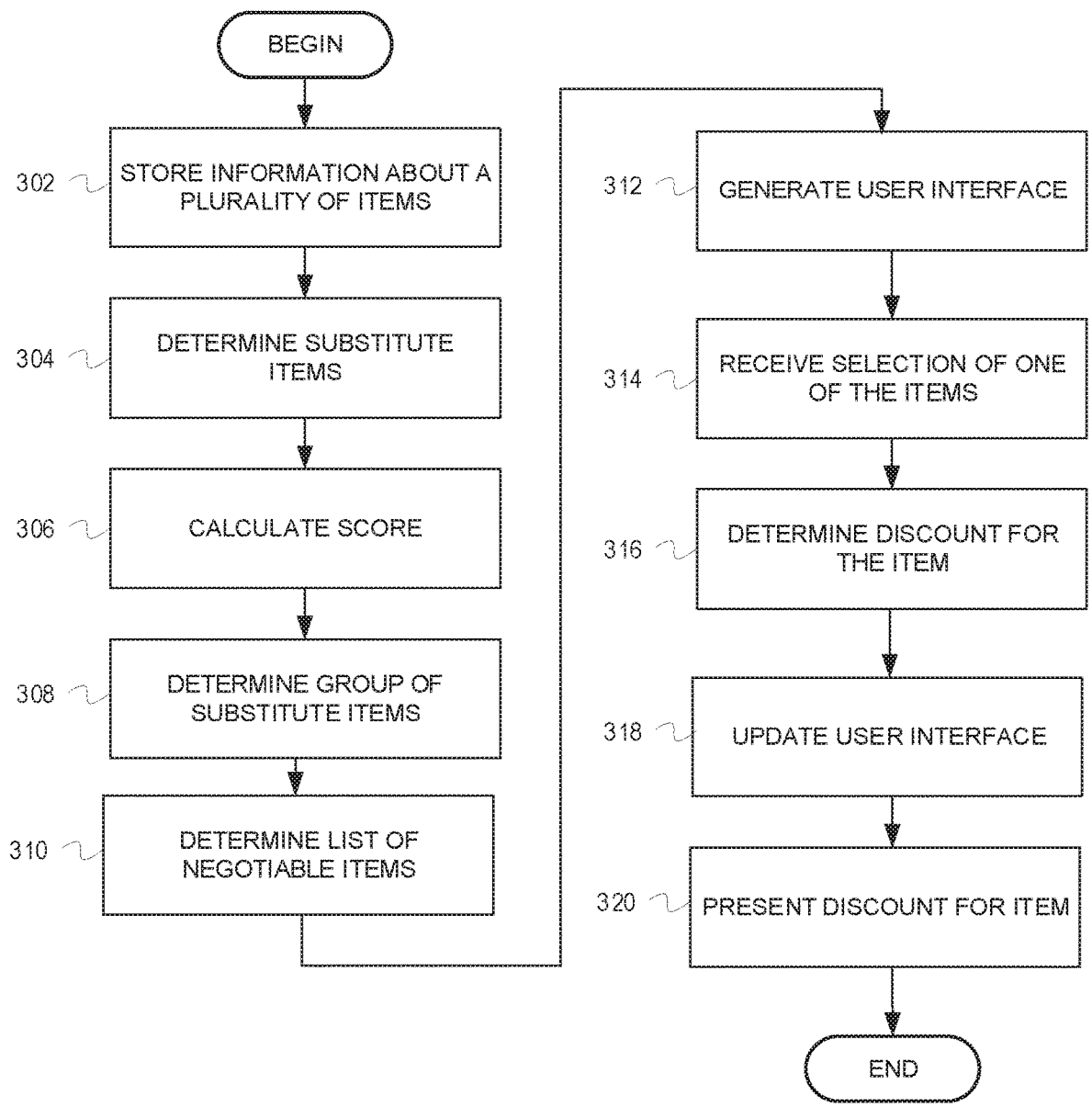
FIG. 3 is a flow chart depicting example operations for automatically determining a discount for an item, according to some embodiments.

While the discussion of FIG. 2 provides additional detail regarding a system for automatically determining a discount for an item, the discussion of FIG. 3 describes example operations of such a system.

FIG. 3 is a flow chart depicting example operations for automatically determining a discount for an item, according to some embodiments. The flow begins at block 302.

At block 302, information about a plurality of items is stored. For example, an item database can store the information about the plurality of items. The information about the plurality of items can include any suitable data. For example, the information about the plurality of items can include costs of the items (e.g., AUCs for each of the items), average retail prices for the items (e.g., AURs for the items), and descriptions of the items. The descriptions of the items can be used to calculate scores for the items. The scores for the items are indicative of how similar an item is to a substitute item. For example, the scores can range from 0-1, 1-10, etc. and represent how similar a substitute item is to the item. In some embodiments, the item database 208 includes indications of substitute items and scores for the substitute items. The information about the plurality of items can include information about items that the retailer sells, items that other retailers sell, and/or items that suppliers provide. The flow continues at block 304.

At block 304, substitute items are determined. For example, a control circuit can determine the substitute items. The substitute items are items that are similar to the item in question. For example, the substitute items may be from a same category of items and/or items that a customer may purchase in lieu of the item. For example, if the item is a bicycle, the substitute items can be other bicycles and/or items that a customer may purchase instead of a bicycle (e.g., a treadmill, a stationary bike, a scooter, etc.). The flow continues at block 306.

At block 306, scores are calculated. For example, the control circuit can calculate scores for each of the substitute items. The scores are indicative of how similar a substitute item is to the item. The control circuit can calculate the scores based on any suitable data and any suitable metrics. For example, the control circuit can calculate the scores based on a cosine similarity analysis, a description similarity analysis, a Jaccard similarity analysis, and/or a two-gram similarity analysis. In embodiments in which multiple analyses are used, the control circuit can combine the scores to determine a single score for the item. For example, the control circuit can take a weighted average of scores for each of the multiple analyses to determine a score for a substitute item. The flow continues at block 308.

At block 308, a group of substitute items is determined. For example, the control circuit can determine the group of substitute items. The group of substitute items can be of any suitable size. For example, the group of substitute items can include all substitute items for an item. Alternatively, the group of substitute items may include only a portion of the substitute items. For example, the group of substitute items may include only those substitute items having certain scores (e.g., scores above a threshold, items with the top three (or five, or 10, etc.) scores, etc.). In some embodiments, other factors may be considered for inclusion in the group of substitute items. For example, the control circuit may determine a minimum, or maximum, number of substitute items (e.g., a requirement may be that there are at least five substitute items or no more than ten substitute items, regardless of the scores). The flow continues at block 310.

At block 310, a list of negotiable items is determined. For example, the control circuit can determine the list of negotiable items. The list of negotiable items includes those items for which it is possible or likely to negotiate a discount. For example, the list of negotiable items can include items for which the margin is below that of the substitute items. The flow continues at block 312.

At block 312, a user interface is generated. For example, the control circuit can generate the user interface. The user interface includes the list of negotiable items. A display device can present the user interface to a user. The flow continues at block 314.

At block 314, a selection of one of the items is received. For example, the control circuit can receive a selection of one of the items from the list of negotiable items via user input at a user interface. The flow continues at block 316.

At block 316, a discount for the item is determined. For example, the control circuit can determine a discount for the item selected from the list of negotiable items. The discount can be based on any suitable metric. For example, the discount can be based on the margin for the item, the margins for the substitute items, sales volume for the item, sales volume for the substitute items, supplier volume, supplier capacity, supplier lead time, number of items a supplier provides to a retailer, etc. The discount can also take any suitable form. For example, the discount may be a dollar figure discount, a target cost for the item, a percentage discount for an item, a range of values, etc. The flow continues at block 318.

At block 318, the user interface is updated. For example, the control circuit can update the user interface. The control circuit updates the user interface to include information about the item, information about the group of substitute items, and the discount for the item. The flow continues at block 320.

At block 320, the updated user interface is presented. For example, the display device can present the updated user interface including the discount for the item, as well as any other information included in the user interface.

Figure 4:
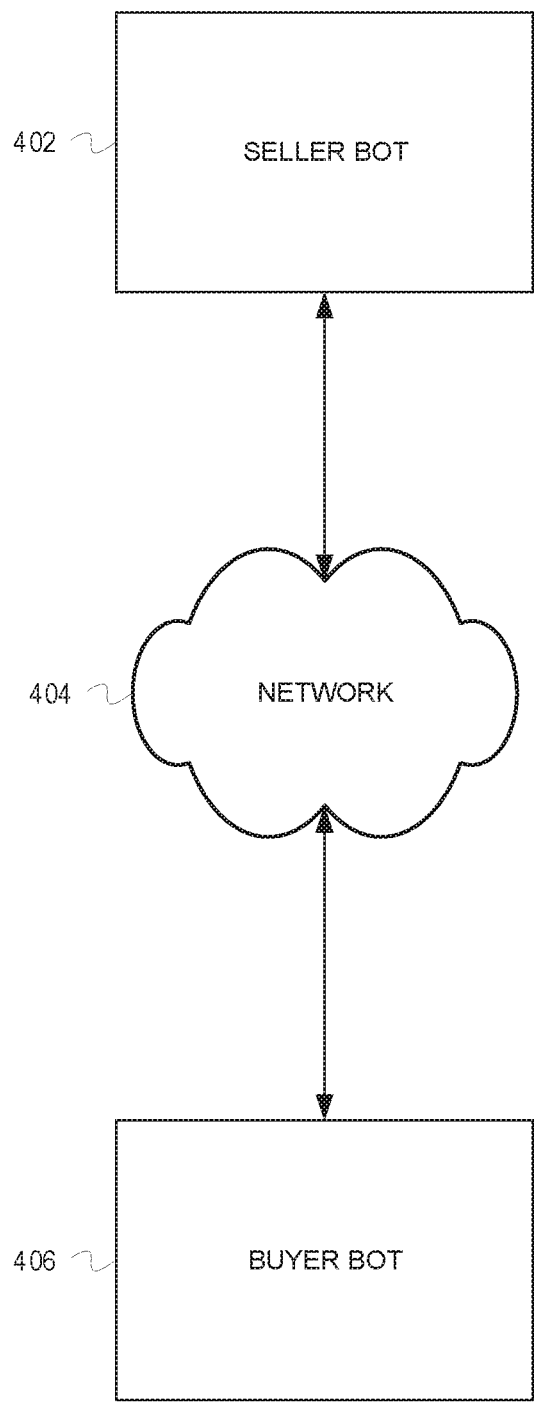
FIG. 4 is a block diagram of a system 400 including a seller bot 402 and a buyer bot 406, according to some embodiments.
Figure 5:
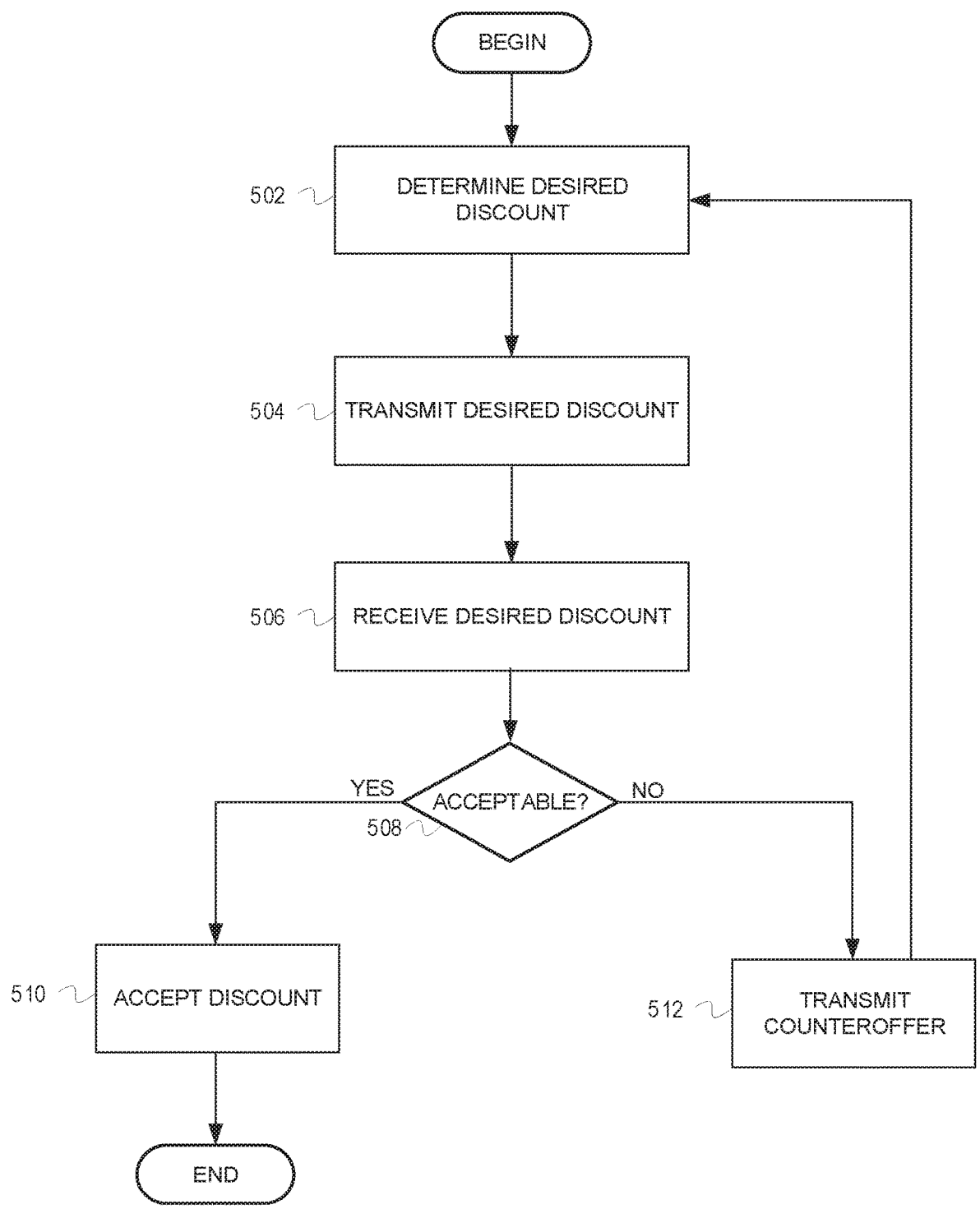
FIG. 5 is a flow chart depicting example operations for a negotiation between a buyer bot and seller bot, according to some embodiments.

While the discussion of FIG. 3 describes example operations for automatically determining a discount for an item, the discussion of FIGS. 4 and 5 describe a negotiation process between a retailer and a supplier can be automated by way of buyer bots and seller bots.

FIG. 4 is a block diagram of a system 400 including a seller bot 402 and a buyer bot 406, according to some embodiments. With respect to FIGS. 1-3 a system is discussed that is capable of amassing information regarding items sold by a retailer and automatically determining a discount for an item. This system can be utilized by a user to aid in negotiations between retailers and suppliers. However, in some embodiments, this system can be adapted to perform autonomous, or nearly autonomous, negotiations for a retailer and/or supplier. In such embodiments, the system 400 can include the seller bot 402 and the buyer bot 406. The seller bot 402 and the buyer bot 406 are communicatively coupled via a network 404, such as the internet.

The seller bot 402 negotiates on behalf of a supplier. That is, the seller bot 402 can perform negotiations for a supplier in lieu of a human performing such negotiations. Likewise, the buyer bot 406 negotiates on behalf of a retailer. That is, the buyer bot 406 can perform negotiations for a retailer in lieu of a human performing such negotiations. The seller bot 402 and the buyer bot 406 can perform these negotiations based on the data and metrics derived with respect to the discussion of FIGS. 1-3. For example, the buyer bot 406 can determine a discount for an item and use the discount for the item as a target when negotiating with the seller bot 402. Conversely, the seller bot 402 can determine a desired cost for the item and use the desired cost for the item as a target when negotiating with the buyer bot 406. The discussion of FIG. 5 describes example operations for such a negotiation.

In some embodiments, the buyer bot 404 can take the place of a human user as discussed with respect to FIGS. 1-3. That is, the buyer bot 404 can interact with the systems described in FIGS. 1-3. In other embodiments, as described above, the buyer bot 404 can be incorporated into the system.

FIG. 5 is a flow chart depicting example operations for a negotiation between a buyer bot and seller bot, according to some embodiments. The flow begins at block 502.

At block 502, a desired discount is determined. For example, a buyer bot can determine the desired discount. In one embodiment, the buyer bot determines the desired discount in much the same way that the system of FIG. 2 determines a discount for an item. For example, the buyer bot can compile a group of substitute items and calculate a desired discount for the item based on the margins, or any other suitable data, for the item and/or the substitute items. The flow continues at block 504.

At block 504, the desired discount is transmitted. For example, the buyer bot can transmit the desired discount to a seller bot. The desired discount may simply be the discount for the item (e.g., a desired price, a desired decrease in price, etc.). In some embodiments, in addition to the discount, the transmission of the discount can include additional information, such as information about the item, information about the substitute items, etc. The flow continues at block 506.

At block 506, the desired discount is received. For example, the seller bot can receive the desired discount from the buyer bot. The flow continues are decision diamond 508.

At decision diamond 508, it is determined whether the desired discount is acceptable. For example, the seller bot can determine if the desired discount is acceptable. If the desired discount is acceptable, the flow continues at block 510 where the seller bot accepts the discount. If the desired discount is not acceptable, the flow continues at block 512.

At block 512, a counteroffer is transmitted. For example, the seller bot can transmit the counteroffer to the buyer bot. In some embodiments, the seller bot determines a counteroffer based on information in much the same way that the buyer bot determined the desired discount.

Although the discussion of FIG. 5 refers to a negotiation process between a buyer bot and a seller bot from the perspective of a buyer bot, such operations are easily adaptable to be performed from the perspective of the seller bot. For example, instead of transmitting a desired discount, the seller bot can determine a desired cost increase for an item and transmit the desired cost increase to the buyer bot.

In some embodiments, a system comprises an item database, wherein the item database includes information about a plurality of items, wherein the information about the plurality of items includes costs of the items, average retail prices for the items, and descriptions of the items, a control circuit, wherein the control circuit is communicatively coupled to the item database, wherein the control circuit is configured to determine, for each of the plurality of items in the database, substitute items, calculate, for each of the substitute items, a score, wherein the score is indicative of how similar a substitute item is to an item, determine, for each of the plurality of items, a group of substitute items, wherein the group of substitute items includes items for which the score is above a similarity threshold, determine, from amongst the plurality of items, based on margins for the substitute items and margins for the plurality of items, a list of negotiable items, generate a user interface, wherein the user interface includes the list of negotiable items, receive, from a user input device, selection of one of the items from the list of negotiable items, determine, for the one of the items based on the margins for a group of substitute items associated with the one of the items, the discount for the one of the items, and update the user interface to present information about the one of the items, the group of substitute items associated with the one of the items, and the discount for the one of the items, a display device, wherein the display device is communicatively coupled to the control circuit, wherein the display device is configured to present the user interface including the information about the one of the items, the group of substitute items associated with the one of the items, and the discount for the item, and the user input device, wherein the user input device is configured to receive, from a user, the selection of the one of the items from the list of negotiable items.

In some embodiments, an apparatus and a corresponding method performed by the apparatus comprises storing, in an item database, information about a plurality of items, wherein the information about the plurality of items includes costs of the item, average retail prices for the items, and descriptions of the items, determining, by a control circuit for each of the plurality of items in the database, substitute items, calculating, by the control circuit for each of the substitute items, a score, wherein the score is indicative of how similar a substitute item is to an item, determining, by the control circuit for each of the plurality of items, a group of substitute items, wherein the group of substitute items includes items for which the score is above a similarity threshold, determining, by the control circuit from amongst the plurality of items based on margins for the substitute items and margins for the plurality of items, a list of negotiable items, generating, by the control circuit, a user interface, wherein the user interface includes the list of negotiable items, receiving, at the control circuit from a user input device, selection of one of the items from the list of negotiable items, determining, by the control circuit for the one of the items based on the margins for a group of substitute items associated with the one of the items, the discount for the one of the items, updating, by the control circuit, the user interface to present information about the one of the items, the group of substitute items associated with the one of the items, and the discount for the one of the items, and presenting, via a display device, the user interface including the information about the one of the items, the group of substitute items associated with the one of the items, and the discount for the one of the items.

In some embodiments, a system for automatically negotiating a discount for an item comprises an item database, wherein the item database includes information about a plurality of items, wherein the information about the plurality of items includes costs of the items, average retail prices for the items, and descriptions of the items, a control circuit, wherein the control circuit is communicatively coupled to the item database, wherein the control circuit is configured to determine, for each of the plurality of items in the database, substitute items, calculate, for each of the substitute items, a score, wherein the score is indicative of how similar a substitute item is to an item, determine, for each of the plurality of items, a group of substitute items, wherein the group of substitute items includes items for which the score is above a similarity threshold, determine from amongst the plurality of items, based on margins for the substitute items and margins for the plurality of items, a list of negotiable items, generate a list of negotiable items, receive, from a buyer bot, selection of one of the items from the list of negotiable items, determine, for the one of the items based on the margins for a group of substitute items associated with the one of the items, the discount for the one of the items, and cause transmission, to the buyer bot, information about the one of the items, the group of substitute items associated with the one of the items, and the discount for the one of the items, and the buyer bot, wherein the buy bot is configured to conduct a negotiation with a seller bot based on the discount for the item.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for automatically determining a discount for an item, the system comprising:
   an item database, wherein the item database includes information about a plurality of items, wherein the information about the plurality of items includes costs of the items, average retail prices for the items, and descriptions of the items;
   a control circuit including a programmable processor, wherein the control circuit is communicatively coupled to the item database, wherein the control circuit is configured to:
   determine, for each of the plurality of items in the database, substitute items;
   calculate, for each of the substitute items, a score, wherein the score is indicative of how similar a substitute item is to an item;
   determine, for each of the plurality of items, a group of substitute items, wherein the group of substitute items includes items for which the score is above a similarity threshold;

determine from amongst the plurality of items and the substitute items stored in the database, and based on profit margins for the substitute items and profit margins for the plurality of items, a list of negotiable items;

generate a user interface displayable on an electronic display, wherein the user interface includes the list of negotiable items;

receive, from a user input device, a selection of one of the items from the list of negotiable items in the user interface;

determine, for the one of the negotiable items, based on profit margins for a group of the substitute items associated with the one of the negotiable items, the discount for the one of the negotiable items; and update the user interface to include:
an average unit cost, an average unit retail, and an average profit margin for the one of the negotiable items,
an average unit cost, an average unit retail, and an average profit margin for the group of the substitute items associated with the one of the negotiable items, and
the discount determined by the control circuit for the one of the negotiable items based on the average profit margin for the group of the substitute items associated with the one of the negotiable items;

a display device including the electronic display, wherein the display device is communicatively coupled to the control circuit, wherein the display device is configured to:
present, on the electronic display of the display device, the user interface including:
the average unit cost, the average unit retail, and the average profit margin for the one of the negotiable items,
the average unit cost, the average unit retail, and the average profit margin for the group of the substitute items associated with the one of the negotiable items, and
the discount determined by the control circuit for the one of the negotiable items based on the average profit margins for a group of the substitute items associated with the one of the negotiable items; and the user input device, wherein the user input device is configured to:
in response to the selection, receive, from a user, the selection of the one of the negotiable items from the list of the negotiable items, based on a signal received from the control circuit, display within the user interface on the electronic display of the display device the discount determined by the control circuit for the one of the negotiable items.

2. The system of claim 1, wherein the discount for the item is one or more of a dollar value to be paid for the one of the items and a dollar amount that should be subtracted from a cost of the one of the items.

3. The system of claim 1, wherein the score is based on one or more of a cosine similarity, a description similarity, a Jaccard similarity, and a two gram similarity.

4. The system of claim 1, wherein the user interface includes a negotiation recommendation.

5. The system of claim 4, wherein the negotiation recommendation is based on one or more of supplier volume, supplier capacity, supplier lead time, and number of items a supplier provides to a retailer.

6. The system of claim 1, wherein the one of the items is sold by a retailer and the substitute items are sold by the retailer.

7. The system of claim 1, wherein the one of the items is sold by a retailer and at least one of the substitute items is sold by a different retailer.

8. The system of claim 1, wherein the group of substitute items includes at least five substitute items.

9. The system of claim 1, wherein the list of negotiable items includes items having a largest margin discrepancy.

10. A method for automatically determining a discount for an item, the method comprising:
storing, in an item database, information about a plurality of items, wherein the information about the plurality of items includes costs of the items, average retail prices for the items, and descriptions of the items;
determining, by a control circuit including a programmable processor, for each of the plurality of items in the database, substitute items;
calculating, by the control circuit for each of the substitute items, a score, wherein the score is indicative of how similar a substitute item is to an item;
determining, by the control circuit for each of the plurality of items, a group of substitute item, wherein the group of substitute items includes items for which the score is above a similarity threshold;
determining, by the control circuit from amongst the plurality of items and the substitute items stored in the database, and based on margins for the substitute items and margins for the plurality of items, a list of negotiable items;
generating, by the control circuit, user interface displayable on an electronic display, wherein the user interface includes the list of negotiable items;
receiving, at the control circuit from a user input device, a selection of one of the items from the list of negotiable items in the user interface;
determining, by the control circuit for the one of the negotiable items, based on profit margins for a group of the substitute items associated with the one of the negotiable items, the discount for the one of the negotiable items;
updating, by the control circuit, the user interface to include:
an average unit cost, an average unit retail, and an average profit margin for the one of the negotiable items,
an average unit cost, an average unit retail, and an average profit margin for the group of the substitute items associated with the one of the negotiable items, and
the discount determined by the control circuit for the one of the negotiable items based on the average profit margin for the group of the substitute items associated with the one of the negotiable items; and
presenting, on the electronic display of a display device, the user interface including:
the average unit cost, the average unit retail, and the average profit margin for the one of the negotiable items,
the average unit cost, the average unit retail, and the average profit margin for the group of the substitute items associated with the one of the negotiable items, and
the discount determined by the control circuit for the one of the negotiable items based on the average profit margins for a group of the substitute items associated with the one of the negotiable items.

11. The method of claim 10, wherein the discount for the item is one or more of a dollar value to be paid for the one of the items and a dollar amount that should be subtracted from a cost of the one of the items.

12. The method of claim 10, wherein the score is based on one or more of a cosine similarity, a description similarity, a Jaccard similarity, and a two gram similarity.

13. The method of claim 10, wherein the user interface includes a negotiation recommendation.

14. The method of claim 13, wherein the negotiation recommendation is based on one or more of supplier volume, supplier capacity, supplier lead time, and number of items a supplier provides to a retailer.

15. The method of claim 10, wherein the one of the items is sold by a retailer and the substitute items are sold by the retailer.

16. The method of claim 10, wherein the one of the items is sold by a retailer and at least one of the substitute items is sold by a different retailer.

17. The method of claim 10, wherein the group of substitute items includes at least five substitute items.

18. A system for automatically negotiating a discount for an item, the system comprising:
- an item database, wherein the item database includes information about a plurality of items, wherein the information about the plurality of items includes costs of the items, average retail prices for the items, and descriptions of the items;
- a control circuit including a programmable processor, wherein the control circuit is communicatively coupled to the item database, wherein the control circuit is configured to:
  - determine, for each of the plurality of items in the database, substitute items;
  - calculate, for each of the substitute items, a score, wherein the score is indicative of how similar a substitute item is to an item;
  - determine, for each of the plurality of items, a group of substitute items, wherein the group of substitute items includes items for which the score is above a similarity threshold;
  - determine from amongst the plurality of items and the substitute items stored in the database, and based on profit margins for the substitute items and profit margins for the plurality of items, a list of negotiable items;
  - generate electronic data representing a list of negotiable items;
  - receive, from an automated software application programmed to buy the items, a selection of one of the items from the list of negotiable items;
  - determine, for the one of the negotiable items, based on profit margins for a group of the substitute items associated with the one of the negotiable items, the discount for the one of the negotiable items; and
  - cause transmission, to the automated software application programmed to buy the items, electronic data including:
    - an average unit cost, an average unit retail, and an average profit margin for the one of the negotiable items,
    - an average unit cost, an average unit retail, and an average profit margin for the group of the substitute items associated with the one of the negotiable items, and
    - the discount determined by the control circuit for the one of the negotiable items based on the average profit margin for the group of the substitute items associated with the one of the negotiable items; and
- the automated software application programmed to buy the items, wherein the automated software application programmed to buy the items conducts a negotiation with an automated software application programmed to buy the items based on the discount determined by the control circuit for the one of the negotiable items.

* * * * *